April 9, 1963 R. U. WHITNEY, JR 3,084,780

APPARATUS FOR ORIENTING, FEEDING AND CRIMPING INSULATED TERMINAL CONNECTORS

Filed March 13, 1959 7 Sheets-Sheet 1

INVENTOR.
ROBERT U. WHITNEY JR.
BY
John Babis Jr.
ATTORNEY.

April 9, 1963 R. U. WHITNEY, JR 3,084,780
APPARATUS FOR ORIENTING, FEEDING AND CRIMPING INSULATED TERMINAL CONNECTORS
Filed March 13, 1959 7 Sheets-Sheet 2

INVENTOR.
ROBERT U. WHITNEY JR.
BY
John Babis Jr.
ATTORNEY

INVENTOR.
ROBERT U. WHITNEY JR.
BY
John Babis Jr.
ATTORNEY

INVENTOR.
ROBERT U. WHITNEY JR.
BY John Babis Jr.
ATTORNEY.

April 9, 1963 R. U. WHITNEY, JR 3,084,780

APPARATUS FOR ORIENTING, FEEDING AND CRIMPING INSULATED TERMINAL CONNECTORS

Filed March 13, 1959 7 Sheets-Sheet 5

INVENTOR.
ROBERT U. WHITNEY JR.
BY
John Babis Jr.
ATTORNEY.

INVENTOR.
ROBERT U. WHITNEY JR.
BY
John Babis Jr.
ATTORNEY.

April 9, 1963 R. U. WHITNEY, JR 3,084,780
APPARATUS FOR ORIENTING, FEEDING AND CRIMPING
INSULATED TERMINAL CONNECTORS
Filed March 13, 1959 7 Sheets-Sheet 7

INVENTOR.
ROBERT U. WHITNEY JR.
BY
John Babis Jr.
ATTORNEY.

United States Patent Office 3,084,780

Patented Apr. 9, 1963

3,084,780

APPARATUS FOR ORIENTING, FEEDING AND CRIMPING INSULATED TERMINAL CONNECTORS

Robert U. Whitney, Jr., Livingston, N.J., assignor to The Thomas & Betts Co., Elizabeth, N.J., a corporation of New Jersey Filed Mar. 13, 1959, Ser. No. 799,198
7 Claims. (Cl. 198—33)

The invention relates to article-handling devices and more particularly to power-actuated apparatus for orienting, feeding and discharging a series of small articles of the character shown in Frey Patent 2,769,965, and for transferring, positioning and finally crimping said discharged articles in seriatim on a bare end portion of insulated wire conductors operatively positioned in said apparatus individually in succession by an operator.

More specifically, the invention resides in an automatic mechanism wherein provision is made for receiving a quantity of insulated terminal connectors in random fashion; for successively orienting and feeding such terminal connectors in predetermined linear relation along an arcuate path and into an inclined channel type dispensing rack or chute with their insulated annular ends first and overlying the flat apertured tongue portion of the preceding terminal connector in "piggy-back" fashion; for successively discharging the connectors from the inclined chute in seriatim onto a horizontal transfer station; for successively transferring each terminal connector laterally from the transfer station into position on an anvil die, including a reciprocal plunger die, constituting a crimping means; and for holding the terminal connector with its tongue portion in a horizontal plane prior to the operation of the reciprocal plunger die thereon in response to the insertion of a bare end portion of an insulated wire conductor through the wire barrel portion of the positioned terminal connector, whereby to contact a switch element for energizing a motor operable to rotate the mechanism through one cycle of operation in which the positioned terminal connector is crimped on the inserted conductor end portion and subsequently withdrawn by an operator, another terminal connector having been moved into crimping position upon completion of the cycle for the subsequent insertion of another wire conductor through the next positioned terminal connector.

Insulated and non-insulated terminal connectors of the apertured tongue type, which are produced in strip form, are known, wherein adjacent pairs of connectors are joined by an integral residual metal web extending between the adjacent tongue portions, as in the case of strips of insulated terminal connectors, and by a similar residual metal web extending between the adjacent wire barrel portion of each pair of such terminal connectors, as in the case of strips of non-insulated connectors. It is also known that such strips of terminal connectors are also pretinned subsequent to the manufacture thereof, or otherwise provided with a suitable metallic film to protect the finished terminal connectors against corrosion.

Automatic crimping machines which are adapted for feeding thereto insulated or non-insulated terminal connectors in strip form and whereby such connectors are individually crimped on wire conductors and at the same time severed from the strip, are also known. However, the end-product produced by such machines from terminal connectors in strip form possessed certain disadvantages by reason of the fact that in the successive severing of each terminal connector from a strip thereof the tinned or other anti-corrosion metallic surface plated thereon is marred or mutilated to the extent that a portion of its base surface is exposed and thus thereafter subject to corrosion at such points of severance.

Accordingly, it is an object of the invention to provide a hopper feeding, orienting, positioning, holding and crimping mechanism which is particularly adapted for handling a quantity of separate, individually complete, insulated terminal connectors, which is not subject to the above-noted disadvantages.

A further object of the invention is to provide an automatic mechanism of the character specified, whereby the crimping of individually complete insulated terminal connectors on a bare end portion of a like number of insulated wire conductors may be performed at a rate which is compatible with the large number of conductors to be found in electrical circuit harness for electronic data processing machines, digital computers and the like.

Another object of the invention is to provide a hopper type orienting and feeding mechanism whereby individually complete insulated terminal connectors are fed to a supply chute and removed therefrom in seriatim and successively automatically positioned in predetermined relation to a crimping mechanism for securing each successively positioned connector on a bare end portion of an insulated wire conductor in response to the insertion thereof through each successively positioned terminal connector.

A further object of the invention is to provide a cyclically operable automatic mechanism which is adapted to be rendered operable by the intrusion thereinto of the bare end portion of an insulated wire conductor for crimping an individually complete insulated terminal connector thereon and for transferring another terminal connector into position for a subsequent crimping operation during each cycle of operation.

Another object of the invention is to provide a cyclically operable automatic mechanism which includes a vibratory hopper and an inclined chute connected therebetween, which is adapted for orienting and feeding individual insulated terminal connectors in predetermined partially superposed linear relation to said chute, and for transferring and positioning said terminal connectors in seriatim from said chute to a crimping mechanism, and for subsequently advancing another terminal connector to said crimping mechanism for a subsequent crimping operation during each cycle of operation.

With the above and other objects in view, the invention resides in the novel construction, combination and arrangement of parts, the novel features of which are set forth with particularity in the appended claims, the invention itself, however, both as to its organization and its method of operation, together with additional objects and advantages thereof, being best understood from the following description of a specific embodiment thereof when taken in connection with the accompanying drawings, in which:

FIG. 1 is a perspective view of the orienting, feeding and crimping mechanism embodying one form of the invention;

FIG. 1*a* is a view showing a conductor with a pair of terminal connectors crimped thereon by the apparatus set forth herein;

Figure 1:
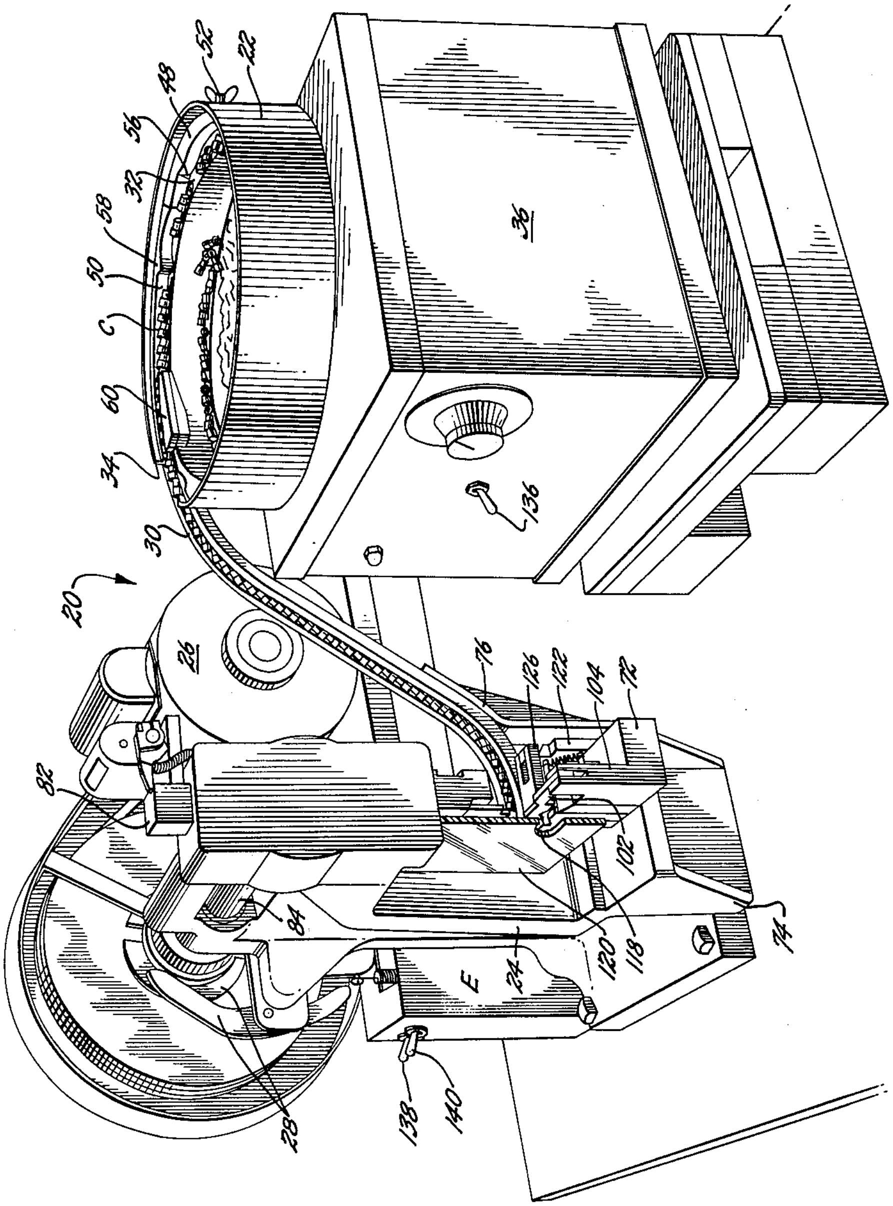
Figure 1A:
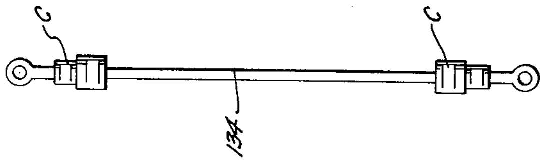
Figure 2:
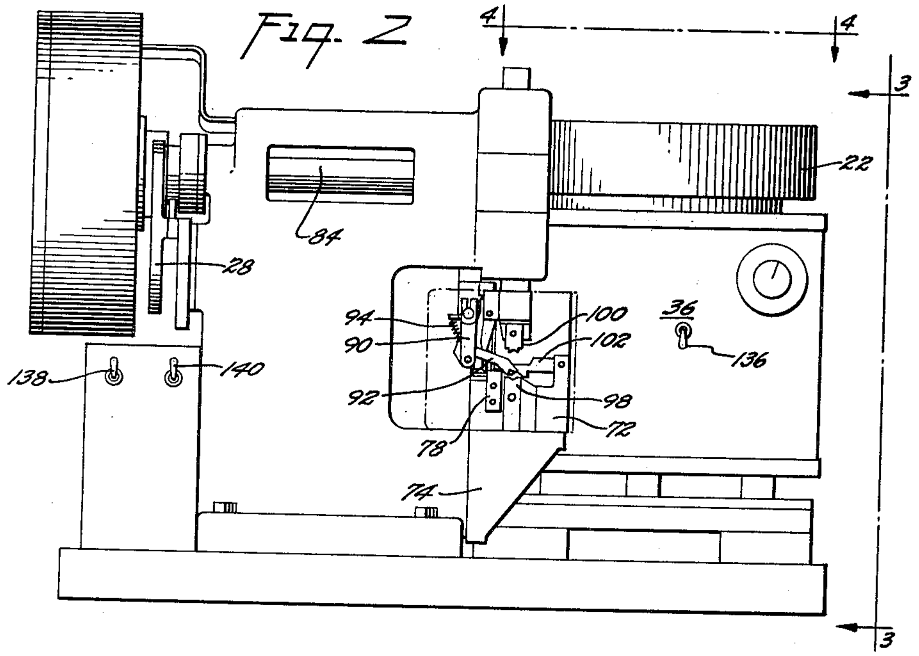
FIG. 2 is a front elevation of the mechanism shown in FIG. 1.
Figure 3:
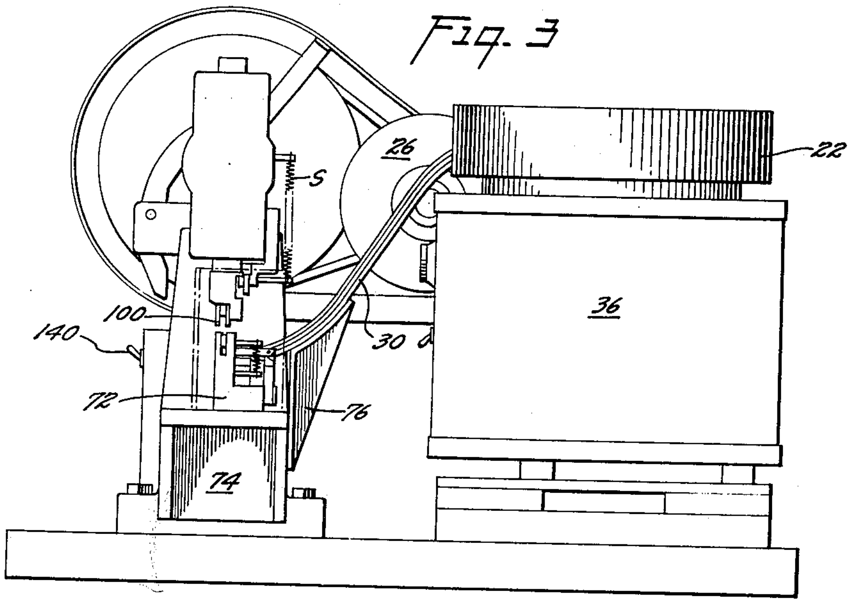
FIG. 3 is an end elevation of the mechanism as seen from the right of FIG. 2.

Referring to the drawings and particularly to FIGS. 1, 2 and 3, the herein described terminal connector feeding, orienting and crimping apparatus, generally indicated at 20, comprises a vibratory hopper bowl 22, a cyclically operable crimping machine 24, including an electric motor drive 26, embodying a conventional single revolution clutch 27 of the pin type, as manufactured by Alva-Allen Industries, Clinton, Missouri, and an inclined storage chute 30 therebetween with its lower end secured to the base of the crimping machine 24, and its upper end disposed in closely spaced relation to the bowl 22, a supply of insulated terminal connectors C of the wire barrel apertured tongue type being shown in the bowl 22 and storage chute 30 in their oriented, partially superposed position in which they are fed from the hopper bowl 22, with their wire barrel end foremost, to the crimping machine 24 by way of the inclined chute 30.

Figure 4:
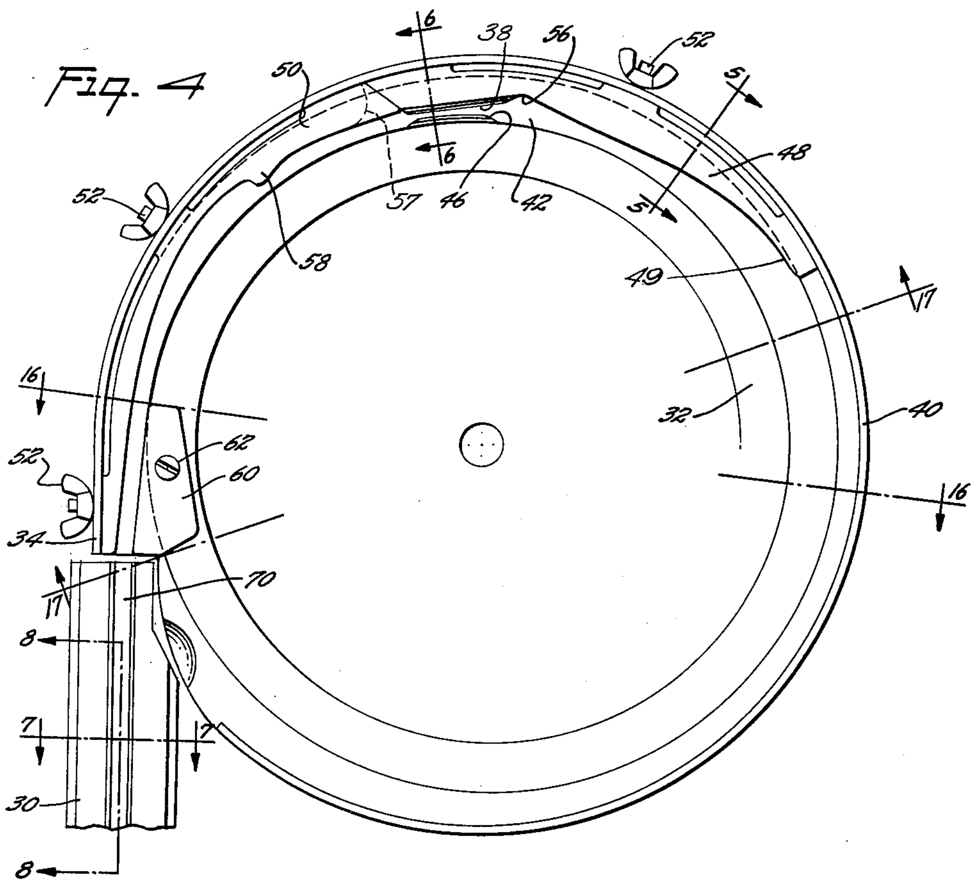
FIG. 4 is a top plan view of the vibratory hopper per se with the upper end of an inclined storage chute connected thereto.

As best shown in FIG. 4, the hopper bowl 22 is provided on its inner periphery with a feed track or ramp 32, progressing upwardly from the floor of the bowl 22, in a spiral path through approximately one and one-half convolutions and terminating adjacent a portion of the interrupted upper edge thereof which is tangent to the true radius of the bowl to form an exit gate 34, with which the upper end of the inclined chute 30 is in spaced registration. The hopper bowl 22 is mounted on vibratory actuating device 36 which vibrates the bowl at one of several selected frequencies in such manner that it imparts a forward movement to the terminal connectors C being fed counter-clockwise relative to the bowl 22. The actuating device 36 is of conventional form and known commercially as a "Syntron" vibratory feeder, and therefore need not be described.

Figure 6:
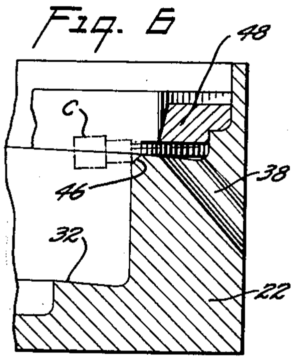
FIG. 6 is a similar transverse fragmentary sectional view taken on the line 6—6 of FIG. 4, showing a terminal connector as advanced to the same position along the spiral track with its tongue uppermost, whereby the connector overhangs the relieved edge of the spiral track and is thus caused to fall by its own weight to the floor of the hopper bowl.

In accordance with the invention, the hopper bowl 22 is provided with an elongated opening 38 through its peripheral wall 40 which slopes downwardly outwardly at an angle from the track surface of the uppermost turn 42 of the feed track 22, as shown in FIG. 6, the inner edge of the track 32 at this point being relieved with an angular chamfer or flat as at 46, all for a purpose hereinafter described.

Figure 17:
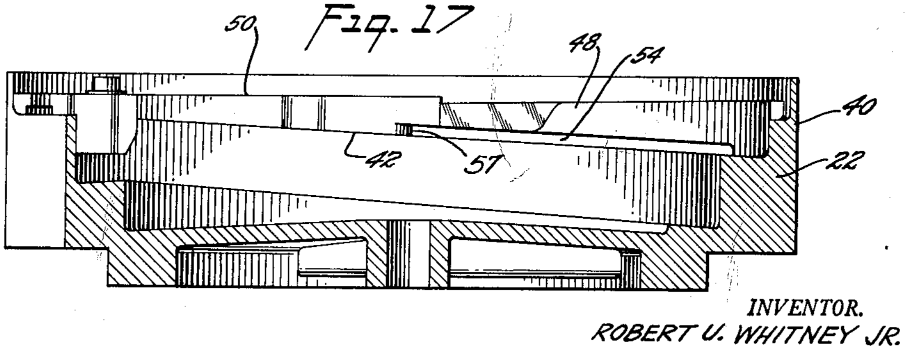
FIG. 17 is a similar view taken on the line 17—17 of FIG. 4 and illustrating in side elevation, the relation of a pair of arcuate camming elements, secured on the inner periphery of the hopper bowl, to a spiral feed track and a slot formed therebetween by one of said camming elements.
Figures 18, 19:
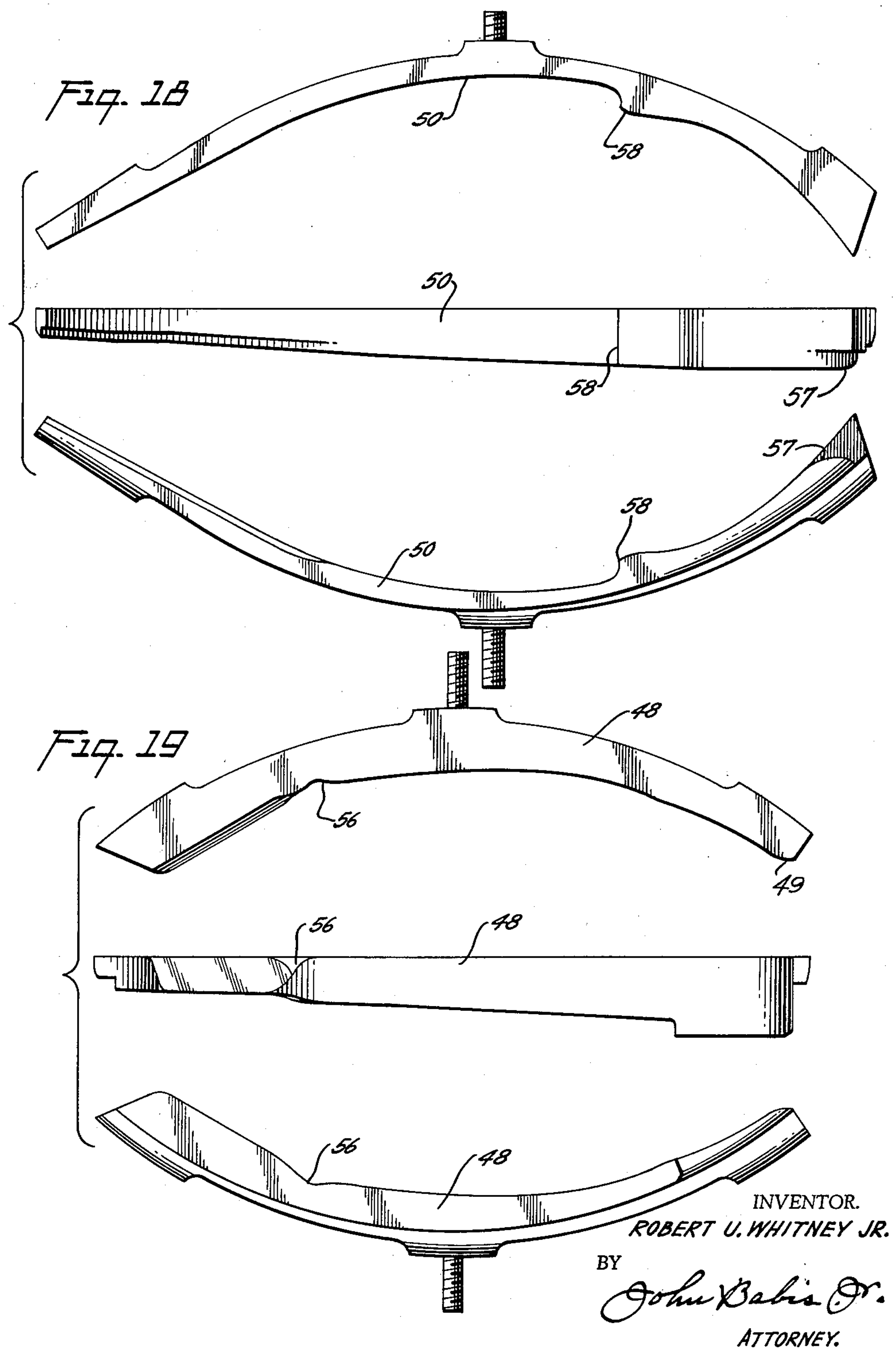
FIG. 18 is a top, side and bottom elevational view of one of the arcuate camming members.
FIG. 19 is a top, side and bottom elevational view of the other one of the arcuate camming members.

Further in accordance with the invention, and as best shown in FIG. 4, a pair of arcuate camming members 48 and 50 are secured, as by means of stud screws 52, on the inner periphery of the hopper bowl 22, the camming member 48, being positioned in spaced relation to the uppermost turn 42 of the feed track 32, to provide a narrow slot 54 therebetween adapted to receive the tongue portion of advancing terminal connectors C therein as they pass under the first camming member 48. The second camming member 50, is positioned on the uppermost turn 42 of the track or ramp 32, as clearly shown in FIG. 17.

In the movement of the terminal connectors C on the feed track 32, as they approach the free beveled end 49 of the camming member 48, some connectors will be disposed tongue end foremost on the track 32, others will be disposed wire barrel end foremost and some with the tongue end foremost but upside down, that is, with the tongue portion spaced from the feed track 32. Accordingly, as the terminal connectors advance in these respective positions along the track 32, the tongue portion thereof will enter the slot 54, after each has passed the beveled end 49 of the first camming member 48, and move along until each reaches the dwell 56, formed in the side wall of the camming member 48, whereby each connector is turned to extend transversely of the track 32 or radially inwardly of the bowl 22, as clearly shown in FIGURES 5 and 6.

Figure 5:
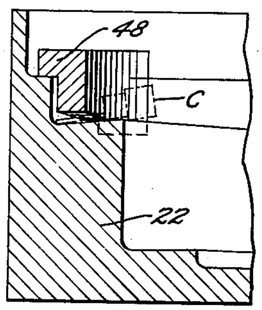
FIG. 5 is a transverse fragmentary sectional view taken on the line 5—5 of FIG. 4, showing a terminal connector with its tongue down on the spiral track on the inner periphery of the hopper and in position to be oriented with its insulated wire barrel end in forward position.

Thus, when a connector is in the position shown in FIG. 5, with its tongue portion down on the track 32 and extending into the slot 54, it will continue to move ahead in this position past the beveled or chamfered edge portion 46, by reason of its balanced position on the track 32, as indicated in broken lines, until its tongue portion strikes the curved underside end portion 57, of the camming member 50, whereby the connector C is turned with its barrel end portion foremost in which position it continues along the track to the chute 30, or if the upper end portion of the track 32 is occupied with connectors to the projection 58, successive connectors will be biased off track 32, by the projection 58, on the camming member 50.

When a connector moves along the track 32, with its tongue portion in "up-side down" position as clearly shown in FIG. 6, the connector will advance in this position until it reaches the beveled or chamfered edge portion 46, where it will become unbalanced by hanging down and fall off the track 32, into the bowl 22.

Figure 8:
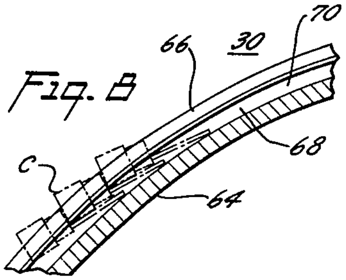
FIG. 8 is a longitudinal fragmentary sectional view of the storage chute showing the manner in which the terminal connectors are oriented and fed thereinto in partially superposed "piggy-back" relation.

When the inclined storage chute 30 is full of terminal connectors disposed in partially superposed piggy-back relation, with their tongue portions in a horizontal plane, as exemplified in FIG. 8, and the continuous feed thereof by the vibratory hopper bowl 22 causes the line of terminal connectors to back up on the uppermost end portion of the spiral feed track 32 to the projection 58 provided on the side wall of the second camming member 50, all oriented terminal connectors advancing past the chamfered edge portion 46 of the spiral feed track 32 will, when they reach the projection 58, be biased thereby off the feed track 32, at this point, and caused to fall therefrom into the hopper bowl 22.

Further in accordance with the invention, the hopper bowl 22 is further provided at the exit or discharge end of the spiral feed track 32 therein, with a guide block or plate 60 secured as at 62 in spaced adjustable relation to one end portion of the camming member 50 and with one end thereof abutting the upper end face of the inclined chute 30, whereby to positively guide an advancing line of oriented terminal connectors C from the discharge end of the spiral feed track 32, into the upper end of the inclined chute 30, the adjustment of the guide block 60 providing for the accommodation of terminal connectors which differ in length and diameter within predetermined limits. For example, connectors having a maximum diameter of .219 inch, .240 inch and .260 inch, respectively, and an overall length of .819 inch, .910 inch and .984 inch, respectively.

Figure 7:
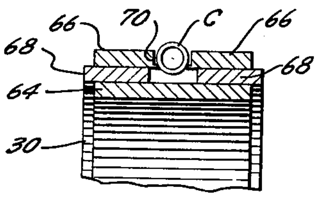
FIG. 7 is a fragmentary transverse sectional view taken on the line 7—7 of FIG. 4, showing the connector passage centrally of the storage chute.

As best shown in FIG. 7, the storage chute 30, comprises a base strip 64, a pair of strips 66 in spaced parallel relation, and a pair of spacer strips 68, disposed in spaced parallelism whereby a channel 70 is provided between the strips 66 for transporting a supply of terminal connectors by gravity feed, one of the strips 66 and one of the spacer strips 68 being foreshortened at the bottom end of the chute 30 to an extent substantially equal to the overall length of a terminal connector C whereby to provide for the lateral ejection of the lowermost terminal connector in the chute 30. As shown in FIG. 3, the lowermost end of the storage chute 30 is secured to a die block assembly 72 suitably secured on the bed plate 74 of an "Allen" type power-actuated press, by means of a suitable bracket 76, an upstanding stop plate 78 being suitably secured on the front face of the die block assembly in spaced central alignment with the bottom end of the chute 30, whereby terminal connectors are prevented from descending beyond the bottom end of the base strip 64 of the chute 30.

Further in accordance with the invention, a terminal connector transfer means for displacing the lowermost terminal connector at the bottom end of the chute 30 to a crimping position comprises an offset bracket 80 suitably secured to the head of the press in depending spaced parallelism with a reciprocable plunger 82 actuated by an eccentric drive connected to a rotatable shaft 84. The depending end of the bracket 80 is provided with a transverse stub shaft 86 carrying a crank arm 88, on its inner end for movement therewith, the crank arm 88 having an anti-friction roller 88' pivoted on its free end, the roller 88' being biased against one side of a transverse slot 89, provided in the lower end portion of the plunger 82, by a suitably anchored retractile spring S, as best shown in FIGS. 9 through 13, whereby the stub-shaft 86 is oscillated through a predetermined angle in response to reciprocatory movement of the plunger or ram 82.

Figures 9, 10:
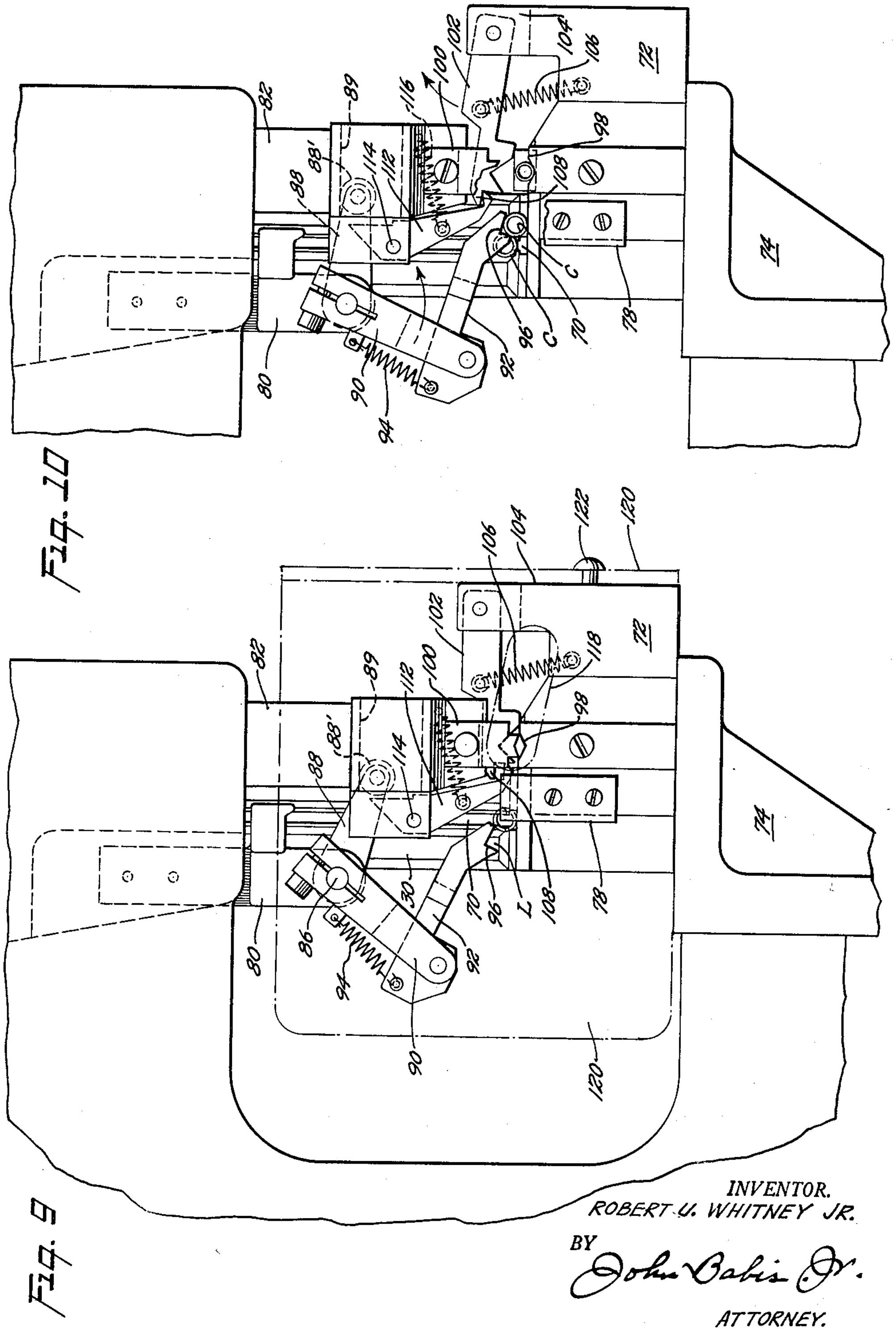
FIG. 9 is a fragmentary front elevation of the head end of the crimping mechanism in position for transferring a terminal connector at the bottom end of the storage chute to crimping position.
FIG. 10 is a similar view showing the position of the mechanism after the transfer of a terminal connector has been initiated.
Figures 11, 12, 13:
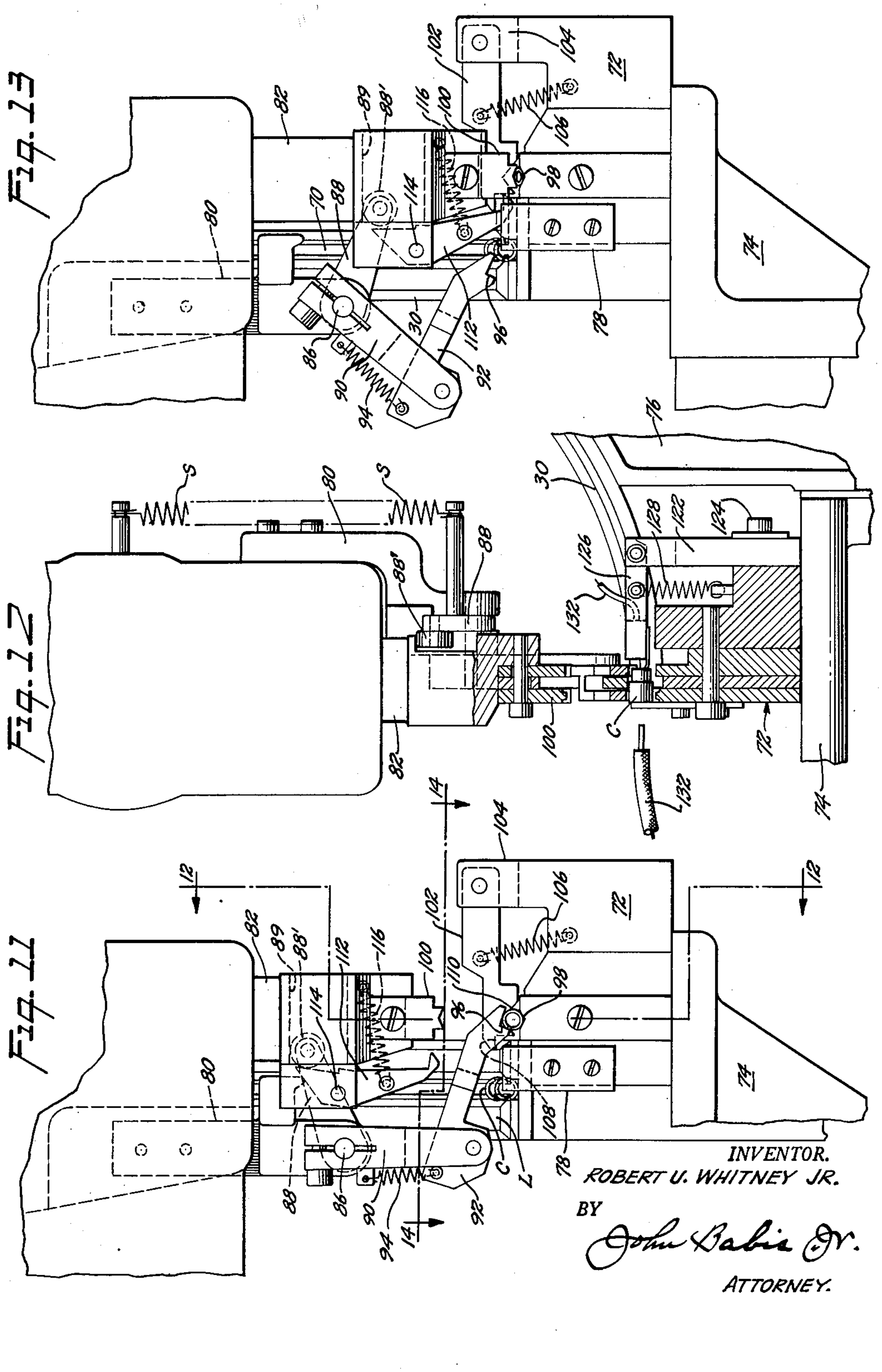
FIG. 11 is a similar view showing the position of the mechanism after a terminal connector has been placed in crimping position and a pivoted, spring-influenced, hold-down lever released thereon.
FIG. 12 is a similar elevational view, partly in section, taken on the line 12—12 of FIG. 11, illustrating a side elevation of a terminal connector as moved to crimping position with its rearwardly extending tongue disposed in a horizontal plane in coactable relation with a circuit-shorting means.
FIG. 13 is an elevational view similar to FIG. 11, showing the mechanism at the end of a crimping operation on a terminal connector and transfer linkage returned to normal position for a subsequent transfer operation.

Further in accordance with the invention, a rocker arm 90 pivotally mounting a transfer arm 92 on one end thereof and biased by means of a retractile spring 94 therebetween, as shown in FIGS. 9, 10, 11 and 13, is secured at its opposite end to the outer end of the stub shaft 86, the arrangement being such that the notched free end 96 of the transfer arm 92 normally rests on the left side L of the bottom end of the inclined chute 30, when the reciprocable plunger 82 is in down position, as in FIGS. 9 and 13.

Further in accordance with the invention, a complementary die block 100 is provided on the free end of the reciprocable plunger 82 and adapted to register with the anvil die 98 for crimping a terminal connector when positioned therebetween with its tongue portion disposed in a horizontal plane, and so held by means of a hold-down lever 102 pivotally mounted on an upstanding clevis arm 104 formed integral with the die block assembly 72 and biased into cooperative relation with the anvil die 98 by means of a retractile spring 106, as shown in FIG. 9, the free end of the hold down lever 102 being provided with a detent 108 and a V-notch 110 adjacent thereto in its bottom edge face adapted for straddling the wire barrel end of a terminal connector when in position on the anvil die 98.

Means for raising the pivoted hold-down lever 102 comprises a latch member 112 which is pivoted to the reciprocable plunger 82 in off-set depending relation, as at 114, and biased toward the plunger 82 in alignment with the hold-down lever 102 by means of a retractile spring 116, whereby when the plunger 82 descends toward the anvil die 98 the latch member 112 will engage the detent end 108 of the hold-down lever 102 for raising the lever 102 in response to upward movement of the plunger or ram 82, whereby to permit the free removal of a crimped terminal connector C from the anvil die 98, through a suitable opening 118 formed in a transparent plastic guard shield 120 suitably secured to the end face of the die block assembly 72, as at 122, to protect an operator against possible injury.

Figure 14:
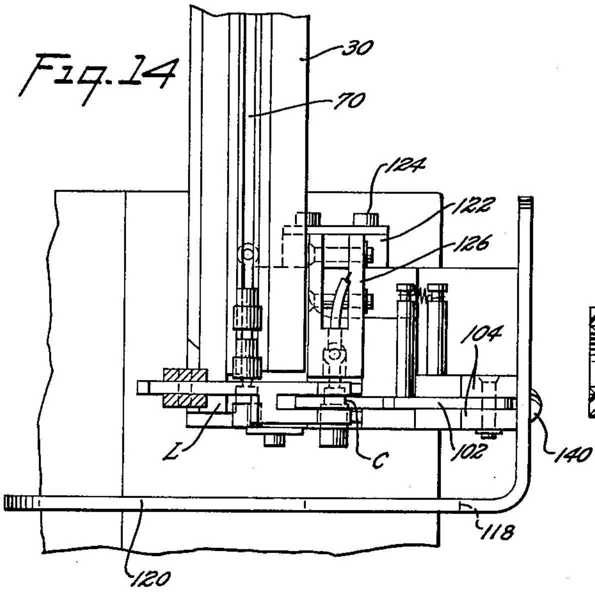
FIG. 14 is a transverse sectional view taken on the line 14—14 of FIG. 11.
Figure 15:
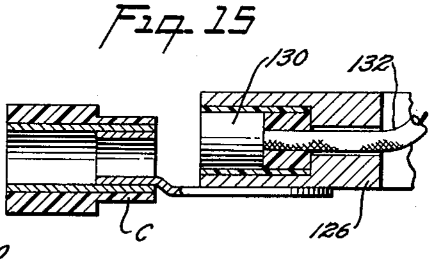
FIG. 15 is an enlarged fragmentary sectional view illustrating the relative position of a terminal connector, as moved to crimping position, with respect to a motor circuit-shorting means substantially in co-axial alignment with the axial center of the wire barrel end portion of the terminal connector.
Figure 16:
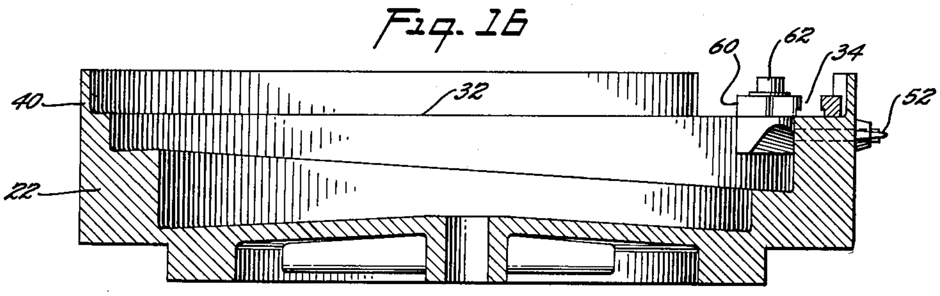
FIG. 16 is a transverse sectional view of the hopper feed bowl per se, taken on the line 16—16 of FIG. 4, illustrating the discharge gate and related guide block tangent with the uppermost peripheral edge of the hopper bowl.

Further in accordance with the invention, means for automatically initiating operation of the crimping mechanism comprises an upstanding bracket 122 secured to the rear side of the die block assembly 72, as at 124, having a metallic arm 126 pivoted to its upper end and extending normal thereto toward the front face of the die block assembly 72 and normally held in this position by means of a suitably anchored, retractile spring 128, as best shown in FIGS. 12 and 14. As clearly shown in FIG. 15, a circuit-shorting contact member 130 is disposed in an axial bore provided therefor in the free end of the arm 126 in insulated relation, with an insulated conductor 132 suitably secured at one end to said contact member 130, and extending rearwardly and outwardly thereof to a circuit energizing means E. As clearly shown in FIG. 12, the pivoted arm 126 with its contact member 130 is disposed substantially in co-axial alignment with the axial center of the wire barrel portion of a terminal connector C, when disposed in crimping position on the fixed anvil die 98 forming part of the die block assembly 72, whereby when the bare end portion of an insulated wire conductor 134 is extended through the positioned terminal connector into engagement with the contact member 130, one cycle of operation will have been initiated. The contact carrying arm 126 is pivoted to the bracket 122 in spring biased relation to provide for the quick and easy removal of a terminal connector which may have become jammed thereunder.

*Operation*

With the apparatus shown and described at rest and devoid of a supply of terminal connectors, a quantity of connectors is deposited in the hopper bowl 22 and the vibratory mechanism and motor circuit energized by setting a plurality of toggle switches 136, 138 and 140, respectively, to "On" position. The terminal connectors C in the hopper bowl 22 will begin feeding onto the spiral track 32 and subsequently pass through the discharge gate 34 in oriented, partially superposed relation into the chute 30, with their tongue portions disposed in a horizontal plane. After a quantity of terminal connectors have been discharged into the chute 30, the first terminal connector at the bottom end thereof is transferred to the anvil die 98 by initiating movement of the crimping mechanism. This is effected by passing the bare end portion of an insulated wire conductor 134 over the anvil die 98 and into contact with the motor circuit-shorting contact 130, whereby the crimping mechanism operates through one cycle during which the rocker arm 90 and transfer arm 92 are actuated, in response to the upward movement of the plunger or ram 82 from down position, and the terminal connector at the bottom of the chute 30 transferred into position on the anvil die 98 by the transfer arm 92, and so held by the arm 92 and the hold-down lever 102, the mechanism having operated through a full cycle and come to rest.

Subsequently, the operator inserts the bare-end portion of a wire conductor through the wire barrel portion of the terminal connector C in position on the anvil die 98 and into contact with the circuit-shorting contact 130, whereby another cycle of operation is initiated in which the plunger die 100 closes on the anvil die 98 to crimp the positioned terminal connector on the inserted bare end portion of the wire conductor 134. During the downward movement of the plunger die 100 on the aforesaid positioned terminal connector, the transfer arm 92 is returned to position at the bottom end of the chute 30, to transfer the next lowermost terminal connector into position on the anvil die 98. In this movement, the previously crimped terminal connector is displaced to the right of the anvil die 98 by the next advancing terminal connector if the operator has not already removed the same by withdrawing the wire conductor 134 forwardly through the transversely elongated opening 118 provided in the upstanding transparent plastic guard shield 120 having the form of an L in cross-section, with its short leg side secured to the die block assembly 72, as at 122.

While the invention has been illustrated and described with respect to one embodiment thereof, it is to be expressly understood that various changes and modifications may be made therein without departing from the inventive concept underlying the same. Therefore, the invention herein disclosed is not to be limited in scope except as is necessitated by the prior art and the definition of the appended claims.

I claim:

1. In a vibratory device for automatically feeding and orienting insulated terminal connectors of the wire barrel apertured tongue type comprising an annular hopper in which a quantity of separate insulated terminal connectors are adapted to be deposited, a spiral peripheral trackway extending from the floor of said hopper substantially to the top edge thereof, means for oscillating said hopper to elevate a series of terminal connectors therein onto and along said spiral trackway, means integral with said hopper including means coactable with said trackway adapted for causing all terminal connectors which are advanced with their tongue portions uppermost, to fall to the bottom of said hopper, a second means coactable with said trackway adapted for orienting all terminal connectors advancing with their tongue portions lowermost, into position with their wire barrel ends foremost, a discharge gate substantially tangent with the top edge of said hopper, and a third means located between said discharge gate and said second means and coactable with said trackway adapted for biasing all oriented terminal connectors off said trackway when a line of terminal connectors backs up from said gate to said third means.

2. The invention set forth in claim 1 characterized further in that said hopper at its discharge gate is provided with guide means in register with said discharge gate adapted to cause oriented terminal connectors advancing along said trackway to become partially superposed in piggy-back relation upon passage therethrough.

3. In a device for automatically feeding and orienting insulated terminal connectors of the wire-barrel, apertured tongue type from random positions, comprising a vibratory hopper bowl in which a quantity of separate insulated terminal connectors are deposited, a spiral peripheral trackway extending from the bottom of said bowl to a discharge gate substantially tangent with the top edge thereof, means for oscillating said bowl to elevate a series of terminal connectors therein onto and along said trackway, means integral with said bowl, including means carried thereby in coactable relation with said trackway, adapted to cause all terminal connectors advancing with their tongue portions uppermost to fall into said bowl, a second means carried by said bowl in coactable relation with said trackway adapted for orienting all terminal connectors advancing with their tongue portions lowermost, into position with their wire barrel ends foremost, and means located between said discharge gate and said second means and integral with said last-named means adapted for biasing all oriented terminal connectors off of said trackway when a line of terminal connectors backs up from said gate to said third means.

4. In a vibratory device for automatically feeding and orienting insulated terminal connectors of the wire barrel, apertured tongue type comprising an annular bowl adapted to receive a quantity of said connectors therein, a spiral ramp on the inner periphery of said bowl extending from the floor thereof substantially to the top edge thereof, means for oscillating said bowl to elevate a series of terminal connectors therein onto and along said spiral ramp, means integral with said bowl including means coactable with said ramp adapted for rotating all terminal connectors which are advanced with their tongue portions uppermost, to fall to the bottom of said bowl, a second means within said bowl coactable with said ramp adapted for orienting all terminal connectors advancing with their tongue portions on said ramp into position with their wire barrel ends foremost, a discharge gate substantially tangent with the top edge of said bowl, and means integral with said second-named means projecting into the path of said ramp adapted for biasing all advancing connectors off of said ramp when the connectors in advance of said last-named means cease advancing.

5. In a vibratory device for automatically feeding and orienting insulated terminal connectors of the wire-barrel, apertured tongue type comprising an annular bowl mounted on an upstanding vibratory armature and adapted to receive a quantity of said terminal connectors therein, means integral with the inner periphery of said bowl providing a spiral ramp from the floor of said bowl to substantially the upper peripheral edge thereof throughout its inner diameter, the upper peripheral edge of said bowl being interrupted along a path tangent thereto to provide a discharge passage from the terminal end of said spiral ramp, arcuate camming means secured on the inner periphery of said bowl in cooperative spaced relation with the uppermost portion of said ramp adapted for successively orienting said terminal connectors in endwise tongue aft position on said ramp, means integral with said ramp in vertical alignment with the intermediate portion of said arcuate camming means adapted for biasing terminal connectors from said ramp when disposed in tongue-inverted position normal thereto, a second arcuate camming means secured to the inner periphery of said bowl in endwise alignment with said first-named camming means adapted for orienting all terminal connectors advancing with their tongue portions on said ramp into position with their barrel-ends foremost, means secured along the inner side of said bowl at said discharge passage in spaced parallel relation with the terminal end of said last-named camming means forming a channel for the discharge of advancing terminal connectors into the upper end of an inclined chute provided with a complementary channel and disposed in spaced alignment therewith.

6. In combination with an annular bowl mounted on an upstanding vibratory armature and adapted for feeding and orienting a random supply of insulated electric terminal connectors of the wire-barrel, apertured tongue type, said bowl having means integral with the inner periphery thereof providing a spiral ramp from the floor thereof to substantially its upper peripheral edge throughout its inner diameter, and said upper peripheral edge interrupted along a path tangent thereto providing a discharge passage from the terminal end of said ramp, of arcuate camming means secured on the inner periphery of said bowl in cooperative spaced relation with the uppermost portion of said ramp adapted for arranging advancing terminal connectors in single file and for subsequently turning said connectors normal thereto with their tongue portions between said ramp and said camming means, means formed on said ramp at a point below the terminal end portion of said camming means adapted for releasing all advancing terminal connectors from said ramp into said bowl when disposed with their tongue portions in inverted position and for maintaining all terminal connectors on said ramp when disposed with their tongue portions in normal position thereon, a second arcuate camming means secured on the inner periphery of said bowl in abutting endwise alignment with said first-named camming means adapted for orienting all advancing terminal connectors into a wire-barrel end-foremost position, said second-named camming means including means intermediate its ends adapted for deflecting oriented terminal connectors from said ramp into said bowl when preceding terminal connectors backup to said last-named means, and guide means secured on the inner periphery of said bowl at said discharge passage in spaced parallel relation with the terminal end of said second-named camming means forming a channel for the discharge of advancing terminal connectors into the upper end of an inclined chute provided with a complementary channel and disposed in spaced alignment therewith.

7. In combination with an annular bowl mounted on an upstanding vibratory armature and adapted for feeding and orienting a random supply of insulated electrical terminal connectors of the wire-barrel, apertured tongue type, said bowl having a spiral ramp integral with its inner periphery from the floor thereof to substantially its upper peripheral edge throughout its inner diameter, and said upper peripheral edge interrupted along a path tangent thereto providing a discharge passage from the terminal end of said ramp, of arcuate camming means secured on the inner periphery of said bowl in cooperative spaced relation with the upper face of said ramp adapted for arranging advancing terminal connectors in single file and for subsequently turning said advancing connectors normal thereto with their tongue portions between said ramp and said camming means, means formed on said ramp and the inner periphery of said bowl in vertical alignment with the terminal end portion of said camming means adapted for releasing all advancing connectors from said ramp into said bowl when disposed with their tongue portions in inverted position and for maintaining all advancing connectors on said ramp when disposed with their tongue portions in normal position thereon, a second arcuate camming means secured on the inner periphery of said bowl in abutting endwise alignment with said first-named camming means with its terminal end portion disposed in said discharge passage adapted for orienting all advancing connectors into a wire-barrel end-foremost position on said ramp, said second-named camming means including means intermediate its ends adapted for deflecting oriented connectors from said ramp when preceding terminal connectors have backed-up to said deflecting means, and guide means secured on the inner periphery of said bowl in opposite spaced relation to the terminal end portion of said second-named camming means forming an open-ended channel for the discharge of advancing connectors from said bowl.

References Cited in the file of this patent

UNITED STATES PATENTS

| | | |
|---|---|---|
| 1,677,968 | Hughes | July 24, 1928 |
| 1,973,720 | Lockie | Sept. 18, 1934 |
| 2,296,983 | Cooper | Sept. 29, 1942 |
| 2,340,448 | Andren | Feb. 1, 1944 |
| 2,545,756 | Andren | Mar. 20, 1951 |
| 2,592,276 | Hackbarth | Apr. 8, 1952 |
| 2,631,213 | Martines | Mar. 10, 1953 |
| 2,756,802 | Gookin | July 31, 1956 |
| 2,799,383 | Spurlin | July 16, 1957 |
| 2,807,350 | Rayburn et al. | Sept. 24, 1957 |
| 2,832,462 | Simer | Apr. 29, 1958 |
| 2,858,008 | Dilts | Oct. 28, 1958 |
| 2,897,870 | Berg | Aug. 4, 1959 |
| 2,904,162 | Simer | Sept. 15, 1959 |
| 2,908,376 | Sahagun | Oct. 13, 1959 |
| 2,918,163 | Willis | Dec. 22, 1959 |